United States Patent [19]

Hippolyte Juy

[11] 3,960,025

[45] June 1, 1976

[54] PUSH FLANGE CONSTRUCTION FOR A PIVOTAL ROLLER SYSTEM OF A SPEED CHANGE MECHANISM

[76] Inventor: Lucien Charles Hippolyte Juy, rue de la Breuchilliere, Zone Industrielle Nord, 21003 Dijon Cedex, Cote d'Or, France

[22] Filed: May 30, 1975

[21] Appl. No.: 582,424

[52] U.S. Cl. ............................. 74/217 B; 74/242
[51] Int. Cl.² ................. F16H 11/00; F16H 9/00; F16H 11/08
[58] Field of Search ................. 74/217 B, 242.11 B, 74/242.14 B, 242.15 B, 242

[56] References Cited
UNITED STATES PATENTS 3,803,933 4/1974 Huret et al. ..................... 74/217 B Primary Examiner—Samuel Scott
Assistant Examiner—A. Russell Burke
Attorney, Agent, or Firm—Haseltine, Lake & Waters

[57] ABSTRACT

Push flange construction of a pivotal roller system of a speed change mechanism for a bicycle, the pivotal roller system having a pair of spaced flanges with at least one rotatable sprocket mounted therebetween on which a chain passes and is wound on a pinion of a gear cluster on the hub of the rear wheel of the bicycle. One of the flanges is a push flange operative to push the chain onto the pinions in the course of speed change when the roller system is transversely displaced, this flange including a peripheral prolongation at that extremity of the flange closest to the pinions of the gear cluster. The prolongation extends over a wide sector whose angular length is such as to allow contact with the chain and pushing thereof at a position closest to the pinions whatever the angular position of the roller system. The surface of the prolongation facing the chain is provided along the length of the sector with a wide profiled chamfer for contacting the chain. The prolongation can be integrally formed with the one flange as a one-piece body or it can be made as a detachable element which can be mounted on a conventional flange.

11 Claims, 12 Drawing Figures

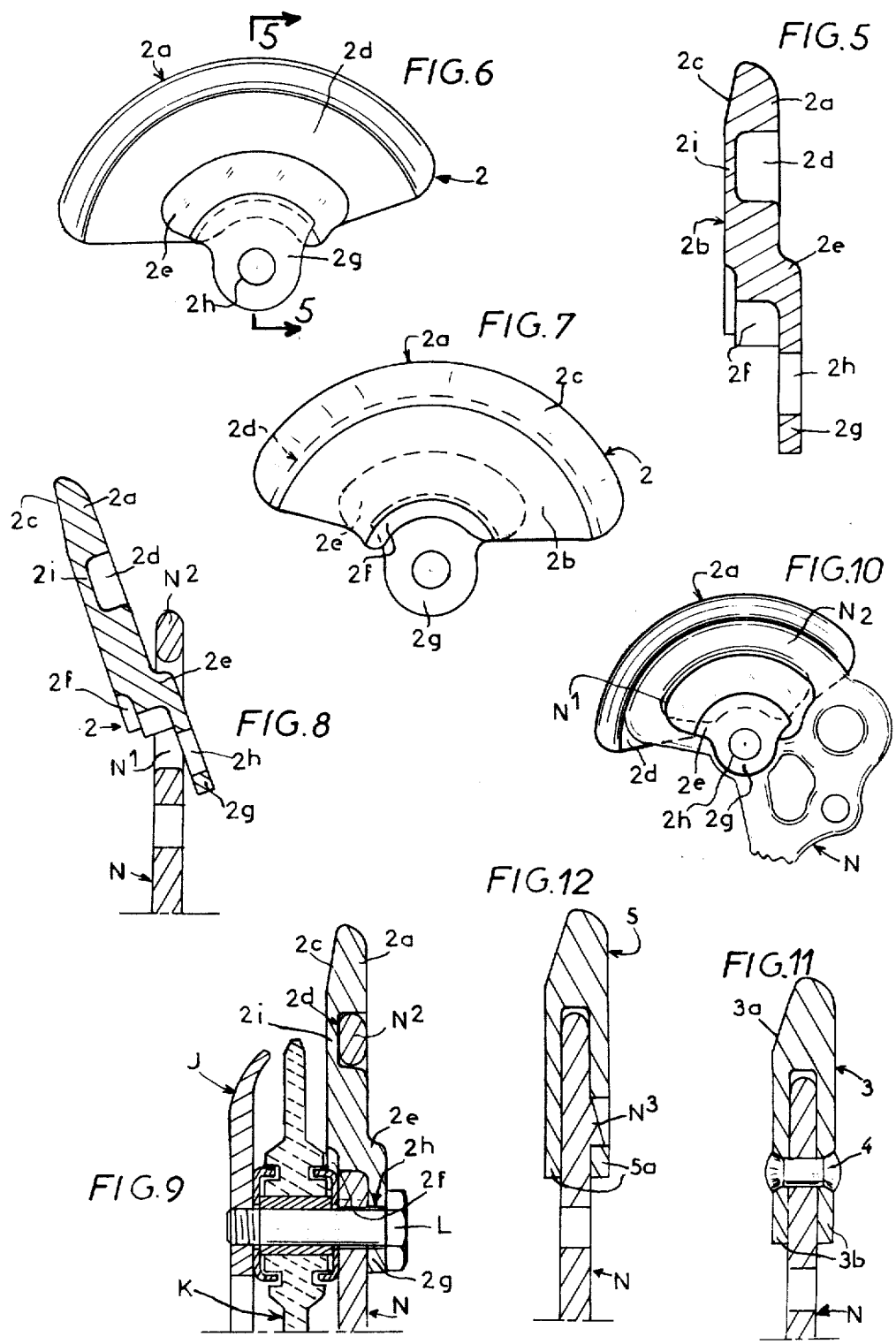

PUSH FLANGE CONSTRUCTION FOR A PIVOTAL ROLLER SYSTEM OF A SPEED CHANGE MECHANISM

FIELD OF THE INVENTION

The invention relates to the construction of a push flange of a pivotal roller system with sprockets adapted for effecting speed changes of bicycles and to the speed change device thus equipped.

The invention is particularly related to the technical field of the propulsion of bicycles and of bicycle accessories and especially to derailleurs or speed change devices.

PRIOR ART

A number of types of change speed devices are known mounted on or near the axle of the rear wheel of a bicycle and comprising a pivotal roller system having one or two sprockets rotatably mounted between a flange and a counter-flange. These speed change devices include means for transverse displacement of the roller system in order to push or pull the chain and advance the same on various pinions of the free wheel solid with the rear hub of the bicycle.

These arrangements present significant disadvantages particularly because the pushing force on the chain is not effectively applied when one wishes to engage the chain succesively on the pinions of increasing diameter. There is poor contact between the chain and the pushing flange, an excessive deformation of the chain, and a delay in the displacement of the chain and in the speed change.

These poor conditions of operation also are associated with a relatively substantial noise due to multiple impact from the links and the rivets of the chain with the push flange of the roller system. These impacts and multiple contacts under poor conditions produce an accelerated wear of the push member with consequent reduced life thereof.

SUMMARY OF THE INVENTION

The push flange according to the invention overcomes these disadvantages and to this end it constitutes a substantial technical improvement.

The push flange is principally characterized by a peripheral prolongation of that extremity of the flange which is closest to the pinions of the free wheel, said prolongation extending over a wide sector whose length corresponds to the length which the chain can bear on and be pushed closest the pinions whatever the angular position of the roller system. Said prolongation has a wide profiled chamfer on the surface pushed against the chain over the extent of the wide sector.

According to another characteristic feature the prolongation on the push flange is integrally formed with the push flange by moulding, injection or the like.

According to another characteristic feature, the prolongation is made in the form of a profiled and conformed push plate to constitute the wide bearing chamfer and the plate is provided with imprints, bosses and complimentry means in order to be adapted and positioned on the flange of the roller system.

Another characteristic feature is found in the fact that the push plate is adaptable and fixed to the flange and has a perforated foot in prolongation of reduced thickness, said foot including a portion which extends through a perforation in said flange to adapt and position the push plate on the flange, the fixation of the plate being effected by the same fastener which assembles the flange and the counterflange, said fastener, e.g. a bolt, also constituting the axle of the roller.

BRIEF DESCRIPTION OF THE DRAWING

FIG. 5 is a sectional view taken along line 5—5 in FIG. 6 showing an embodiment of the invention in the form of push plate that can be adapted and fixed to a conventional flange, FIGS. 6 and 7 are elevational views of the embodiment of FIG. 5 respectively from the exterior and interior of the push plate, FIG. 8 is a sectional view showing the push plate in the course of engagement thereof with the flange, FIG. 9 is a sectional view showing the push plate in engaged position on the flange and the assembly thereof with the remainder of the roller system, FIG. 10 is a side elevational view of a portion of the roller system of FIG. 9, and FIGS. 11 and 12 are transverse sections of different embodiments of attachment of a push plate to the flange.

DETAILED DESCRIPTION

There is seen in FIGS. 1–4 a non-limitative embodiment of a speed change mechanism of the type which is mounted at the rear hub of the bicycle. On the hub is mounted and fixed in conventional manner a free wheel having a gear cluster of a plurality of pinions of increasing diameter: B1, B2, B3, B4 . . . There are four pinions in the illustrated embodiment, but it is obvious that the gear cluster can comprise more or less number of pinions.

A plate C of the speed change mechanism is mounted on the axle of the rear wheel and fixed to plate D of the frame which carries the change speed assembly. This arrangement is merely given by way of example and the speed change mechanism could be fixed in any other manner with respect to the frame.

The speed change mechanism illustrated by way of example is one whose transverse displacement mechanism is of the type comprising an articulated parallelogram, the application of the invention not being limited however to a change speed mechanism equipped with such parallelogram mechanism. The parallelogram mechanism comprises an upper connection cap E pivotably mounted on plate C, two links F, G pivotably connected to the cap E, a lower pivotal connection with cap H on the axis of which the roller system is pivotably mounted with elastic recall.

The roller system comprises a flange 1 and a counter-flange J which are suitably profiled and perforated. Between the flange and the counter flange are mounted, for free rotation, sprockets K on which the chain is engaged and displaced. The axles of the sprockets are constituted by bolts L which assemble the flange and the counter flange.

According to the invention (FIGS. 1–4) the extremity of the flange 1 which is closest to the pinions B1, B2 . . . , is formed with a prolongation 1a which projects into closest proximity with the pinions taking into account the pivoting of the change speed mechanism and of the roller system and also the spacing necessary between the prolongation 1a and the pinion of greatest diameter (pinion B4 in this case). The prolongation 1a extends over a wide sector corresponding in length to the length on which the chain M can engage according to the angular positions of the roller systems.

Figure 1:
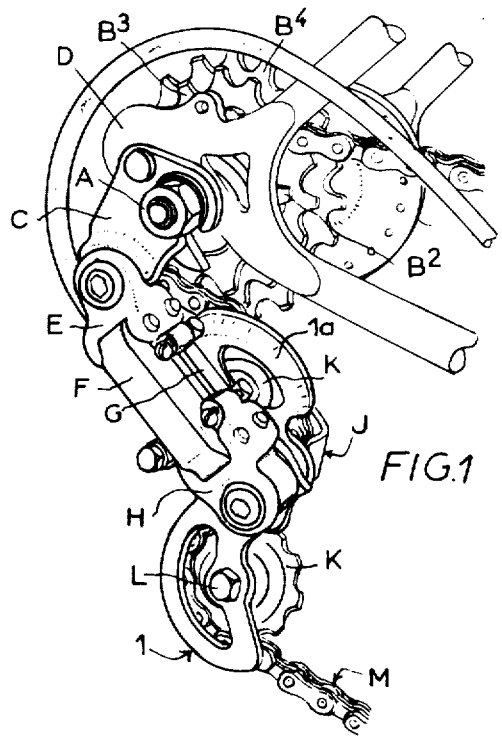
FIG. 1 is a perspective view of an assembled change speed mechanism of the pivotal roller type having a push flange according to the invention, the change speed device being mounted and fixed on an axle of the rear wheel adjacent the pinions of the gear cluster on the free wheel.
Figure 4:
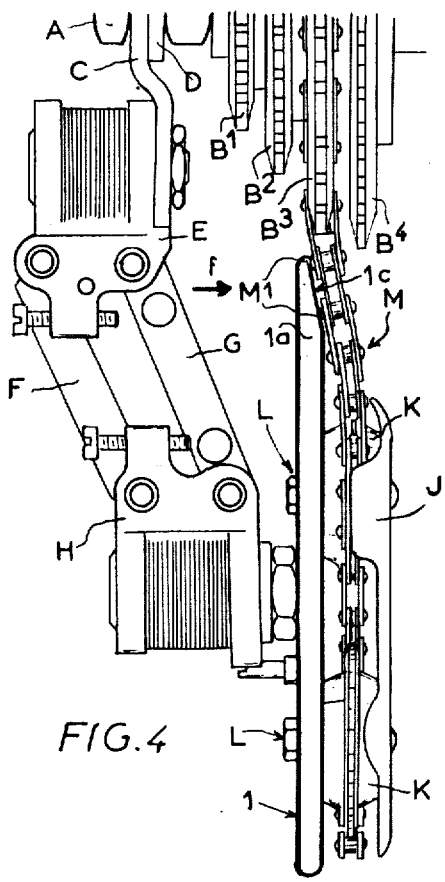
FIG. 4 shows on enlarged scale a side view of the assembly according to FIG. 1.
Figure 2:
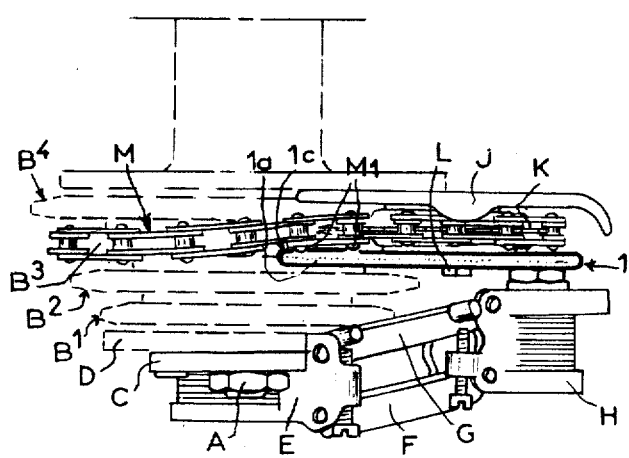
FIG. 2 is a plan view of the assembly, there being illustrated for clarity of the drawing, in dotted lines the hub and the free wheel which normally are placed above the roller system, the deformed lower length of the chain and the pinions of the gear cluster.
Figure 3:
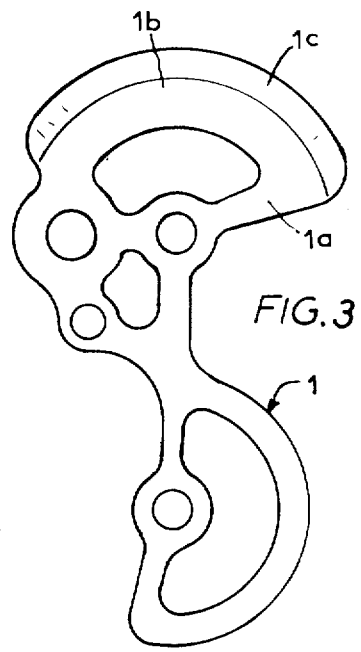
FIG. 3 is a side elevation view on a substantially enlarged scale of the push flange according to the invention as seen from the side of the face which bears and pushes against the chain.

On the face 1b of flange 1 for pushing against the chain M, i.e. the face visible in FIG. 3, the edge of the sector of flange 1 is formed with a large chamfer 1c of profiled form for contacting the chain. According to the illustrated embodiment, the chamfer 1c has a rectilinear profile (FIG. 4). The chamfer however could also have a slightly convex profile.

In the embodiment of FIGS. 1–4, the flange 1 is integrally formed with the prolongation as a one-piece body. This one-piece body can be made of metal or other materials of suitable characteristics by moulding, injection, stamping or the like. As shown in particular in FIGS. 2 and 4, the prolongation 1a and its chamfer 1c causes the flange 1 to adapt itself to and accompany the deformation of the chain M when the latter is pushed in the direction of arrow 1 to the closest of the pinions to wind it thereon up to the pinion of greatest diameter.

There is obtained a better contact with the chain since it makes contact with at least two projecting extremities of rivets M1, that is to say, a plurality of links contact the contoured prolongation 1a at surface 1c. This contact follows for a substantial portion of the deformation of the chain which is pushed and this in a manner much closer to the pinions then before.

Since the chain is subjected to substantial forces, the risk of deterioration and of rupture is substantially limited. The more extended contact and better application diminishes the wear forces, especially the effect of displacement of the chain between the pinions and consequently, the speed change is effected very sensitively and much faster because the forces are reduced. Moreover, the chain is better guided and contacted near the pinions. The change of speed is more rapid and smoother.

A lining or cover of plastic material or other protective material can be applied on the assembly of the flange or only on the portion 1a, 1b, 1c. Then the effect of impact and noise can be even further reduced.

A surface hardening treatment can also be made on the part 1a, 1b, 1c in the case of a one piece metallic flange, for example.

In the embodiment of FIGS. 5–8, there is utilized in a particularly beneficial manner, a perforated flange N of conventional type. There is attached thereto a push plate 2 constructed and arranged to constitute the prolongation of the extremity of the flange with the large contact chamfer, and the push plate has a conformation permitting its easy and rapid adaptation and attachment to the flange.

The push plate 2 has the form of a wide sector 2a suitably extended from the extremity of the flange and furnishing the necessary size for pushing the chain whatever the angular position of the roller system. There is provided on the push face 2b of the plate 2, a wide chamfer 2c which provides efficient contact with the chain at the time of pushing thereof on to a pinion of greater diameter. The push plate 2 has a groove 2d in its periphery, a central shoulder portion 2e, a recess 2f, and a foot 2g perforated at 2h. The foot 2g is formed as a central prolongation with a reduced thickness compared to the thickness of the push plate. The form of groove 2d and shoulder 2e are adapted to permit the mounting of the push plate on the perforated extremity of the flange N. The recess 2f is adapted to accommodate a washer mounted on one side of the axis of the wheels K.

The adaptation and the rapid mounting as well as the fixation of the push plate 2 on the extremity of the flange N are clearly illustrated in FIGS. 8–10.

The foot 2g is introduced through the perforation N1 of the flange N. The foot is then applied against the flange whose rim N2 engages with necessary play in the groove 2d. The central shoulder portion 2e engages in the perforation N1 and angularly immobilizes the push plate. There is advantageously utilized a bolt L to assemble the flange N, the counter flange J and the roller K, while also fixing the push plate 2.

The advantages are those already described and it is to be still noted in this case the push flange 2 is preferably formed of plastic material of good characteristics and in a manner preferred for plastic material known under the trademark Delrin which provides a certain flexibility with a very high resistance to wear.

In this way there is substantially eliminated the noise due to multiple impacts and vibrations of the links and rivets of the chain which is driven. These vibrations are damped if one considers the elasticity effect of the portion 2a due to the groove 2d and the reduced thickness of the portion 2g. The portion 2a deflects by its reduced elasticity under the pressure and multiple impacts resulting from passage of the links which slide on the portion 2a–2c and escapes from the push forces while the chain is wound on the pinion.

The push plate 2 is very easily removable in the case of wear as well as to utilize plates of different sizes, for example, if the sizes of the free wheel are modified or even if the mounting systems of the speed on change mechanisms of the bicycle are modified.

According to the embodiments illustrated in FIGS. 11 and 12, therein are seen push plates connected to the flange N according to modified arrangements. These push plates are preferably made of plastic material.

According to FIG. 11, the push plate 3 which has a large chamfer 3a, comprises branches 3f which have a certain elasticity for straddling the extremity of the flange N. Attachment means such as a rivet 4, or bolts or the like can be employed to effect the assemblage.

There is shown in FIG. 12 a similar embodiment in which a push plate 5 has branches 5a adapted to straddle, with a certain elasticity, the extremity of the flange N. The latter has on one or both faces bosses N3 whose outer surface is inclined from the face of the flange. The branches 5a have corresponding holes for the engagement of the bosses N3. When the branches are engaged on flange N, the branches are moved away from one another due to the effect of the inclined face of the boss N3 whereafter the boss engages in the hole and the push plate is retained on the flange N.

The push plate can be optionally constructed as two half portions assembled on opposite sides of the flange.

What is claimed is:

1. Push flange construction for a pivotal roller system for speed change mechanisms for bicycles, the pivotal roller system having a pair of spaced flanges with at least one rotatable sprocket mounted therebetween on which a chain passes and is wound on a pinion of a gear cluster on the hub of a wheel of the bicycle, one of the flanges being a push flange operative to push the chain onto pinions of increasing diameter in the course of speed change when the roller system is transversely displaced, the improvement wherein said one flange includes a peripheral prolongation at the extremity of the flange which is closest to the pinions of the gear cluster, said prolongation extending over a wide sector whose length is such as to allow contact with the chain and pushing thereof closest to the pinions whatever the angular position of the roller system, said prolongation having a surface facing the chain and being provided thereon along the length of said sector with a wide profiled chamfer for engaging the chain.

2. The improvement according to claim 1 wherein the prolongation of the push flange is integrally formed with said one flange as a one-piece body.

3. The improvement according to claim 1 comprising a cover on at least the prolongation and chamfered part of the push flange, said cover being made of protective material for eliminating noise.

4. The improvement according to claim 1 wherein at least the prolongation and chamfered portion of the push flange is surface hardened.

5. The improvement according to claim 1 wherein said prolongation is constituted as a profiled push plate with means for mounting on said push flange.

6. The improvement according to claim 5 wherein said push plate includes a perforated foot of reduced thickness, said foot being passed through a perforation provided in said push flange to adapt and position the push plate on said flange and means assembling said push plate to said flange and constituting an axle for the sprocket of the roller system.

7. The improvement according to claim 5 wherein said push plate is made of plastic material.

8. The improvement according to claim 5 wherein said push plate comprises branches which elastically straddle the push flange and means securing the branches to the push flange.

9. The improvement according to claim 8 wherein the means securing the branches to the push flange includes a boss on either a branch or push flange and a hole in the other, said boss having an inclined face to facilitate engagement of the boss in the hole.

10. The improvement according to claim 8 wherein the push plate comprises two parts assembled on opposite sides of the push flange.

11. The improvement according to claim 1 wherein the chamfer on the push flange has a rectilinear profile or a profile of slightly convex form.

* * * * *